July 6, 1926.
E. W. DRIEMEYER
1,591,082
BRACKET FOR AUTOMOBILE HEADLAMPS
Filed Nov. 16, 1923
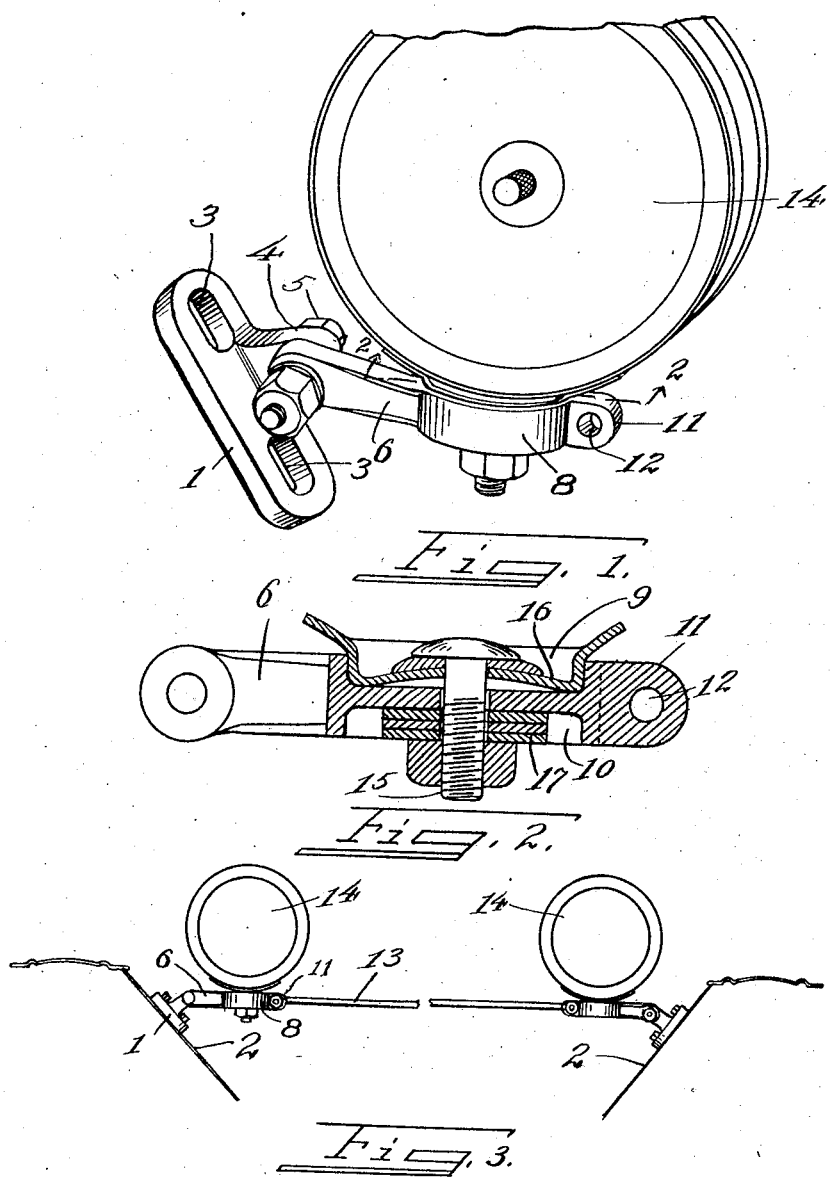
INVENTOR:
Edward W. Driemeyer,
BY Arthur H. Ewald,
ATTORNEYS.

Patented July 6, 1926.

1,591,082

UNITED STATES PATENT OFFICE.

EDWARD W. DRIEMEYER, OF CINCINNATI, OHIO, ASSIGNOR TO THE K-D LAMP COMPANY, OF CINCINNATI, OHIO, A CORPORATION OF OHIO.

BRACKET FOR AUTOMOBILE HEADLAMPS.

Application filed November 16, 1923. Serial No. 675,226.

My invention relates to brackets for mounting automobile headlamps.

The principal object of this invention is to provide and adjustable bracket of simple and substantial construction, the same being particularly adapted for what is known as the S. A. E. type of mounting.

A further object of this invention is to provide on brackets of the type mentioned, suitable tie-rod connections whereby the adjustment of the brackets may be rigidified.

Other objects of the invention will appear from the following detailed description thereof.

In the drawings:—

Figure 1 is a perspective of a bracket and headlamp constructed in accordance with this invention;

Figure 2 is a section on line 2—2 of Figure 1;

Figure 3 is a rear elevation of a pair of headlamps mounted on brackets constructed in accordance with this invention, showing the tie-rod connection;

The numeral 1 indicates a plate adapted to be secured to the apron 2 of an automobile fender. The plate 1 may be of any suitable shape and is provided with slots 3 for bolts or rivets by means of which the same is secured to the apron 2. The plate 1 is provided with a short arm 4 which is perforated for a bolt 5 by means of which an arm 6 is pivotally secured to the plate. The arm 6 is provided with a circular portion 8, the two faces of which are provided with recesses 9 and 10. Beyond the portion 8 is a finger 11 provided with a perforation 12 arranged to receive one end of a tie-rod.

The headlamp 14 is secured to the arm 6 by means of the usual bolt 15 which extends through the concavo-convex pad 16 of the ordinary S. A. E. type mounting; said pad fits into the recess 9, and the usual washers 17 rest within the recess 10.

When a pair of brackets constructed in accordance with this invention is mounted on the aprons of the car fenders, the lamps are universally adjustable about the axes of bolts 5 and 15, and such adjustments may be secured by means of the nuts on said bolts, the tightening of said nuts expanding the concavo-convex pads to a tight fit in the respective recesses 9. As further tending to secure such adjustments the tie-rod 13 is secured in the respective perforations 12 of the fingers 11, and when thus secured, the connection between the two brackets tends to stiffen and rigidify the adjustment, thus lessening any tendency to deviate therefrom.

Having thus fully described my invention what I claim as new, and desire to secure by Letters Patent, is:—

1. In combination with an automobile head lamp having a circular concavo-convex pad, a bracket comprising a plate arranged to be secured to a portion of an automobile, an arm pivotally secured to said plate, said arm being provided with a circular recessed portion adapted to receive said concavo-convex pad, and a bolt for pivotally securing said pad in said recess through the concavo-convex portion thereof, whereby the tightening of said bolt is caused to compress said pad in said recess to rigidify the mounting.

2. In combination with an automobile head lamp having a circular concavo-convex pad, a bracket comprising a plate arranged to be secured to a portion of an automobile, an arm pivotally secured to said plate, said arm being provided with a circular recessed portion adapted to receive said concavo-convex pad, a bolt for pivotally securing said pad in said recess through the concavo-convex portion thereof, whereby the tightening of said bolt is caused to compress said pad in said recess to rigidify the mounting, and a finger on said arm arranged to secure one end of a tie rod.

EDWARD W. DRIEMEYER.